United States Patent [19]

Ueno

[11] Patent Number: 4,854,014

[45] Date of Patent: Aug. 8, 1989

[54] FASTENER

[75] Inventor: Hideyuki Ueno, Yokohama, Japan

[73] Assignee: Toska Co., Ltd., Tokyo, Japan

[21] Appl. No.: 242,474

[22] Filed: Sep. 9, 1988

[30] Foreign Application Priority Data

Sep. 11, 1987 [JP] Japan .................................. 62-226251

[51] Int. Cl.⁴ ............................................. B65D 63/00
[52] U.S. Cl. ............................ 24/16 PB; 24/30.5 P;
292/319
[58] Field of Search ........... 24/16 PB, 17 AP, 30.5 P;
292/318, 319, 320, 321; 248/221.4

[56]  References Cited

U.S. PATENT DOCUMENTS

| 3,718,355 | 2/1973 | Canter | 24/16 PB |
| 3,816,879 | 6/1974 | Merser et al. | 292/318 |
| 3,881,759 | 5/1975 | Fuehrer | 292/321 |
| 3,954,295 | 5/1976 | Harley | 292/319 |
| 4,240,183 | 12/1980 | Sumimoto et al. | 24/16 PB |
| 4,420,857 | 12/1983 | Clay | 24/30.5 P |
| 4,559,676 | 12/1985 | Paradis | 24/16 PB |

FOREIGN PATENT DOCUMENTS

2653260 12/1977 Fed. Rep. of Germany ...... 292/320

Primary Examiner—Victor N. Sakran
Attorney, Agent, or Firm—Ralph M. Burton

[57]  ABSTRACT

The fastener disclosed by the invention comprises a filament, a head provided to one end of the filament, and a socket provided to the other end of the filament, these parts being integrally formed of synthetic resin, the head having a groove extending in the direction of its axis and a rib formed in the groove, the head also having a skirt on the head around the groove and flaring away from the front end of the head, the skirt being interrupted at one part by the groove, the socket having an insertion hole in which an annular flange is provided for engagement with the skirt.

5 Claims, 7 Drawing Sheets

FIG. 1

PRIOR ART

FIG. 2

PRIOR ART

FIG. 3

PRIOR ART

FIG. 4

PRIOR ART

PRIOR ART

FIG. 16

FASTENER

BACKGROUND OF THE INVENTION

The present invention relates to a synthetic resin fastener used to attach tags and labels indicating the price and quality to merchandise, seal the covers of instruments or meters, connect together a pair of slippers and sandals, and close the mouth of bags.

Many patent applications have been filed regarding such fasteners, and the U.S. Pat. No. 4,240,183 may be cited as an example.

Figure 1:
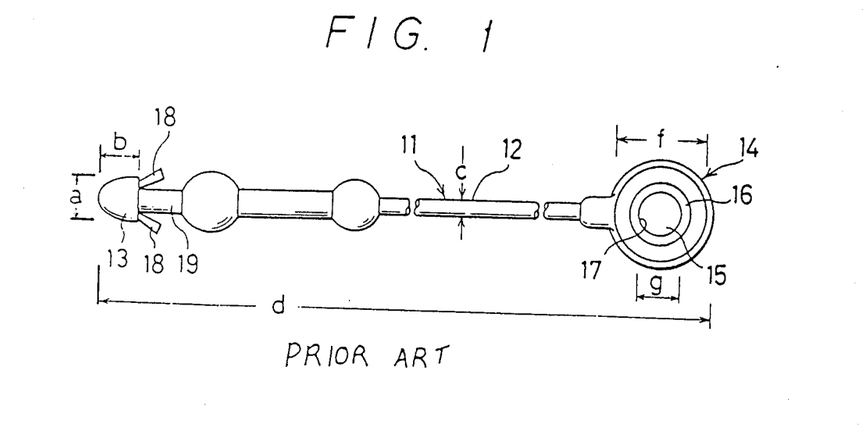
FIG. 1 is an enlarged front view of a conventional fastener.
Figure 2:
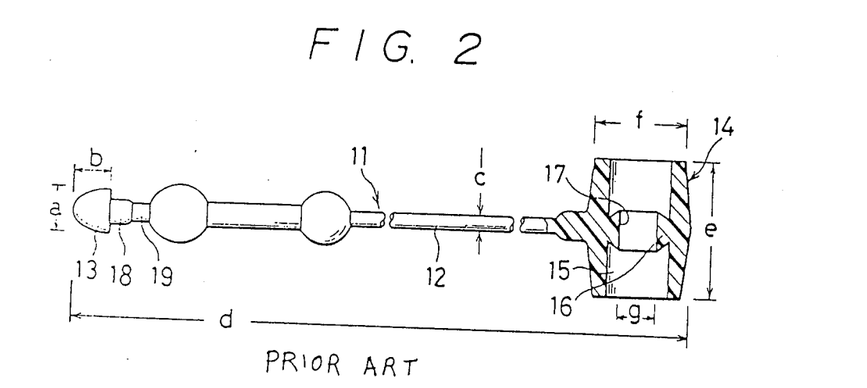
FIG. 2 is a partly cross-sectioned side view of FIG. 1.

The fastener 11 disclosed in the above U.S. patent, as shown in FIGS. 1 and 2, consists of a filament 12, a socket 14 secured to one end of the filament 12, and a head 13 secured to the other end of the filament 12. Such fasteners must be very small because the smaller and the less conspicuous the fasteners, the more easily and clearly the tags and labels can be seen. The fastener shown in FIGS. 1 and 2 has the following dimensions:

```
a = about 1.5 mm,   b = about 2.5 mm,
c = about 0.8 mm,   d = about 140 mm,
e = about 5 mm,     f = about 3.5 mm,
g = about 2 mm.
```

Figures 3, 4:
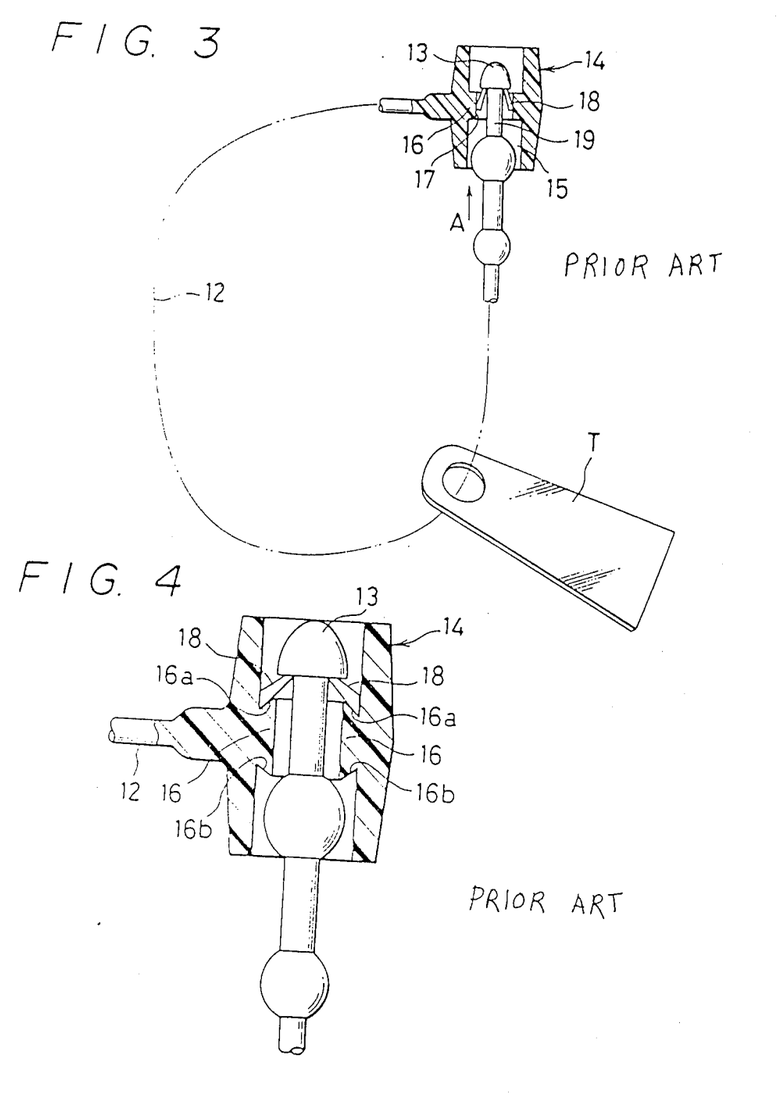
FIG. 3 FIG. 4 are partly cross-sectioned explanatory drawings showing the process of inserting the head into the socket for secure engagement.

As shown in FIG. 3, the head 13 is inserted into an insertion hole 15 of the socket 14 and passed through an insertion wall 17 of an annular flange 16 formed in the insertion hole 15 until it engages with the annular flange 16 as shown in FIG. 4.

The fastener 11 is formed of synthetic resin such as nylon and polypropylene in one piece, so that a large number of fasteners with the same quality can be produced. The fastener 11 is very small and slender and thus easy to attach to merchandise. It is also good in terms of design and therefore, in recent years, consumed in large quantities worldwide.

However, when such fasteners are to be attached to a large number of articles at a time, the following problems arise.

(1) The filament 12 (FIGS. 1 and 2) is stretched to make it fine and stronger after being formed of synthetic resin. After being taken out of the stretching process, the fasteners 11 are packed into bags, for example 1000 pieces a bag with the heads 13 aligned and put on the bottom side of the bag and the sockets 14 on the inlet side.

However, since the head 13 has two engagement projections 18, 18, the fasteners 11 are easily caught by others. Furthermore, some filaments may get slightly curved by moisture absorption after stretching or by distortion during molding, which makes troublesome the work for aligning the individual fasteners that are in disarray when taken out of the stretching process and packing into a bag.

(2) When the fasteners are to be attached to merchandise, a number of fasteners, about 50 pieces, are taken out at one time from a 1000-piece bag. As mentioned above, the fasteners are packed in the bag with the sockets 14 aligned on the inlet side of the bag, but since the engagement projections 18 project from the heads 13, a number of other fasteners get entangled with those being taken out and are also drawn out together with those intended to be taken out.

As a result, a group of fasteners taken out have to be realigned, with the sockets disposed at the top, lowering the tag attaching preparation work efficiency.

(3) From a lump of about 50 fastener taken out of the bag, individual fasteners are picked up one by one for use. As in (2), a socket 14 is picked up by fingers. However, in this case also, the entanglement between the engagement projections of adjacent heads or between the engagement projections and sockets makes it difficult to swiftly pick up the fasteners one by one. As a result the work efficiency is affected adversely.

(4) As shown in FIG. 4, the engagement projection 18 has a sharp edge at the end, so that the engagement projections 18 can securely be locked with the annular flange 16 that has annular engagement surfaces 16a and 16b at its top and bottom. The sharp edges of the engagement projections 18, however, may injure the fingers of the operator.

(5) The engagement projections 18 will easily catch and damage fiber products.

(6) As mentioned above, the fasteners should be as small and fine as possible. However, the head 13, as described above, has elastic engagement projections 18 protruding from the rear end thereof, so that structurally the projections 18 must bear the engagement force between the head 13 and the socket 14. This means that the head 13 can hardly be further reduced in size. The socket 14 into which the head 13 is inserted has also little chance of being reduced in size.

(7) When the head 13 is passed through the annular wall 17 of the annular flange 16 formed in the insertion hole 15 of the socket 14, the engagement projections 18 that are normally flared open are closed or settled onto the neck 19 while being inserted. Therefore, the finer the neck 19, the easier it will be to fold the flared engagement projections 18 to provide a smaller distance between the tips of the projections.

However, since the neck 19 is not subjected to the stretching process, it is significantly fragile compared to the filament 12 that were reinforced by stretching. Therefore, reducing the diameter of the neck 19 will result in reduction in the strength of the head 13.

On the other hand, since the engagement projection 18 is a part that bears the tension that acts on the filament, i.e., the engagement force between the head 13 and the socket 14, the engagement projection 18 cannot be made thinner.

(8) While thickening the neck 19 will increase the strength of the head 13, it renders difficult the folding of the flared engagement projections 18, increasing the resistance against the head and the projections passing through the annular wall 17.

(9) When the engagement projections 18 are formed larger, the engagement force will increase. However, it also increases the resistance against the projections passing through the annular wall 17 of the annular flange 16. Making the engagement projections 18 smaller will render the passage through the annular wall 17 easy, but reduce the engagement force.

(10) Molding of the engagement projections 18 requires a mold with high precision, the manufacturing of which is costly.

SUMMARY OF THE INVENTION

A primary object of the invention is to provide a fine and thin fastener whose head and socket are reduced in size.

A second object of the invention is to provide a fastener whose head is smaller than that of a conventional fastener but more securely fastened in the socket.

A third object of the invention is to provide a fastener which has a very small resistance against the head being inserted into the socket.

A fourth object of the invention is to provide fasteners so formed that they can be neatly aligned and arranged into a group for packing which can easily be loaded into a bag; that a group of fasteners can be taken out of the bag containing fasteners without the other fasteners being caught by those fasteners intended to be taken out; and that the fasteners thus taken out can each be picked up one by one.

A fifth object of the invention is to provide a fastener which is simple in the head structure so that the structure of the head mold can be made simple thereby increasing the durability of the mold and reducing the manufacturing cost of the fasteners.

Such objectives of the invention can be achieved by a fastener which comprises a filament, a head provided to one end of the filament, and a socket provided to the other end of the filament, these parts being integrally formed of synthetic resin, the head having a groove formed in the direction of its axis and a rib formed in the groove, the head also having a skirt on the head around the groove and flaring away from the front end of the head, the skirt being interrupted at one part by the groove, the socket having an insertion hole in which an annular flange is provided for engagement with the skirt.

DESCRIPTION OF THE PREFERRED EMBODIMENTS

Now, the embodiments of the invention will be explained by referring to the attached drawings.

Figure 5:
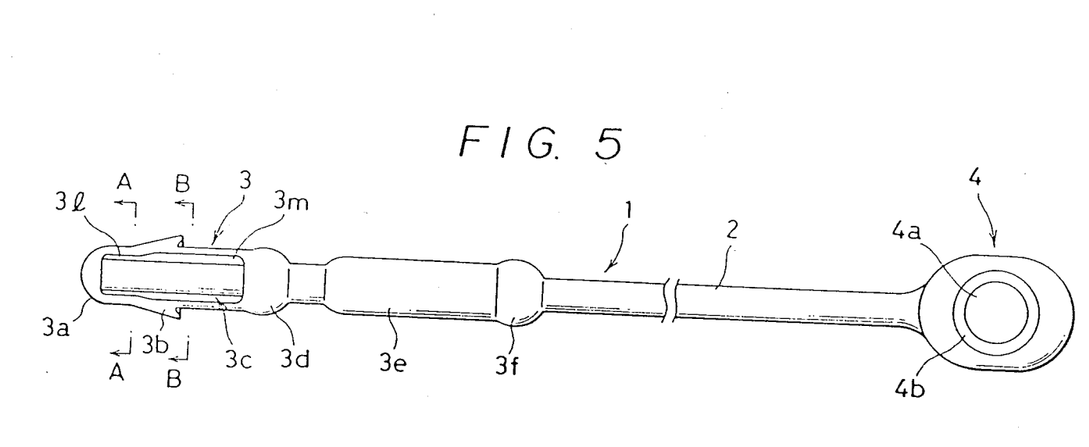
FIG. 5 is an enlarged front view of a fastener as the first embodiment of the invention.
Figure 6:
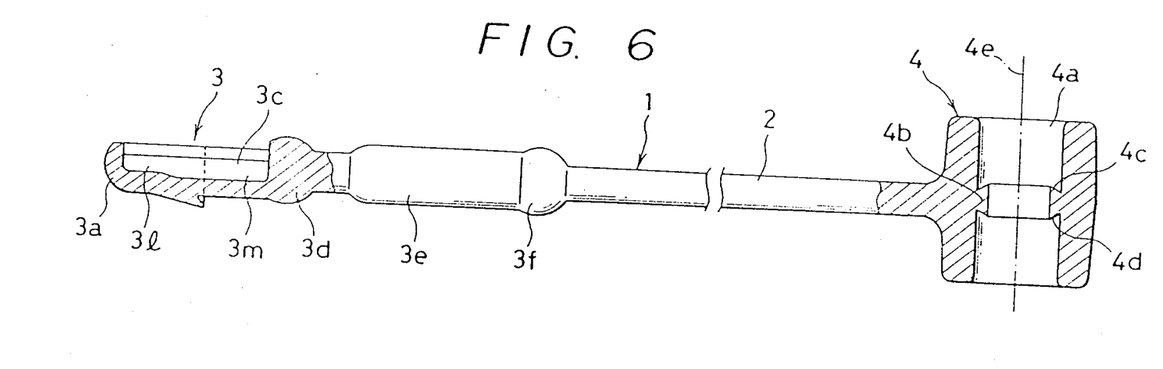
FIG. 6 is a partly cross-sectioned side view of FIG. 5.

As illustrated by the first embodiment in FIGS. 5 and 6, the fastener 1 according to the invention consists of a filament 2, a head 3 provided to one end of the filament 2, and a socket 4 provided to the other end of the filament 2, and these parts are formed integrally of synthetic resin such as nylon and polypropylene.

The filament 2 is stretched at low or high temperatures to increase the level of molecular orientation and thereby the strength. The head 3 is cylindrical with a front end 3a shaped hemispheric. That resin part of the head 3 behind the front end 3a is cut along the axis to form a groove 3c, near the longitudinal center of which is provided a skirt 3b that flares away from the front end 3a. At the rear of the groove 3c there are a bulge (stopper) 3d, a grip 3e and a bulge 3f in that order.

What is important in this invention is that a rib 3p is provided inside the groove 3c.

As shown in FIG. 6, the groove 3c consists of a shallow front groove 3l and a deep rear groove 3m. These stepped grooves are formed so that the wall of the front groove 3l is thicker than the wall of the rear groove 3m. The two grooves are connected by an inclined surface as shown in FIG. 6 or by a step. It is also possible to form a groove with a uniform depth instead of the stepped grooves.

Figure 7:
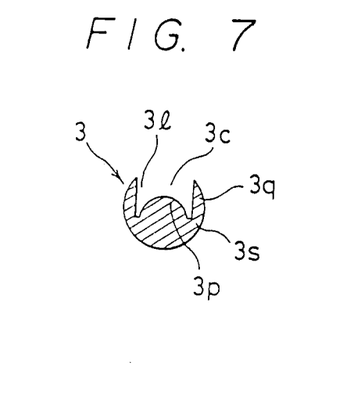
FIG. 7 is a cross-sectional view taken along the line A—A FIG. 5.
Figure 8:
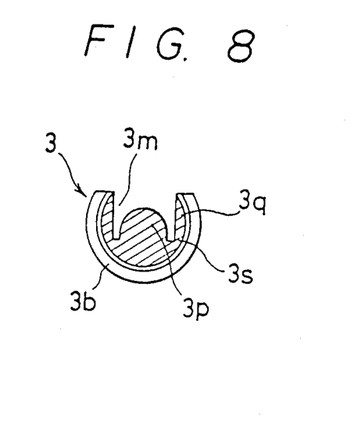
FIG. 8 is a cross-sectional view taken along the line B—B of Fi 5.
Figure 9:
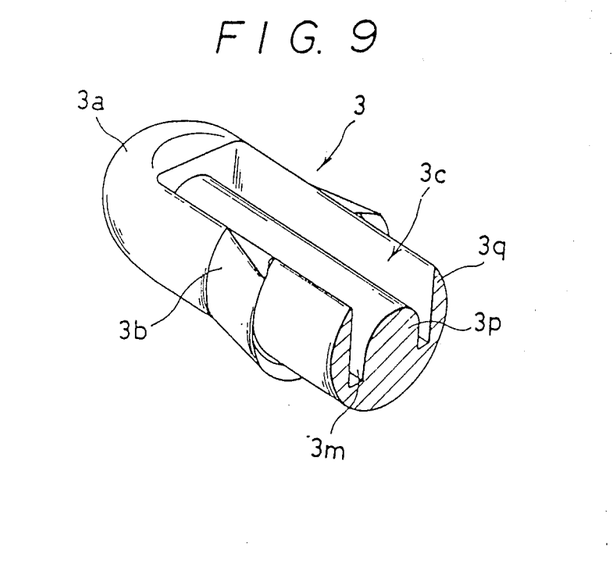
FIG. 9 is an enlarged perspective view of the fastener according to the invention showing the internal structure cross-sectioned head.

As shown in FIGS. 7 through 9, the rib 3p is formed at the center of the groove 3c with walls 3q on each side of the rib 3p. The skirt 3b is provided so as to surround the axis of the head 3 with one part of the skirt interrupted by the groove 3c. The circumferential length of the skirt 3b at the rear portion is about three fourths (270°/360°) of the entire circumference because a part of the skirt is cut off. The rear end surface of the skirt 3b is inclined making an acute angle with the axis of the head 3, as shown in FIGS. 5 and 6, so that it can be securely engaged with the inclined annular engagement surfaces 4d, 4c (described later) of the annular flange 4b formed in the socket 4. It is also possible to form the rear end surface of the skirt 3b perpendicular to the axis of the head 3.

The socket 4 has an insertion hole 4a extending in the direction of its axis as shown in FIGS. 5 and 6. At the center of the insertion hole 4a is formed an annular flange 4b extending in the direction perpendicular to the axis of the socket 4. The annular flange 4b has inclined annular engagement surfaces 4c, 4d and the thickness of the annular flange 4b progressively increases toward the axis 4e of the socket 4. The cross-section of the annular flange 4b is shaped like a fish tail as shown in FIG. 6.

The inclination angles of the annular engagement surfaces 4c, 4d preferably coincide with the inclination angle of the rear end surface of the skirt 3b. It is also possible to form the annular engagement surfaces 4c, 4d perpendicular to the axis 4e Next, the design philosophy of the fastener of the invention will be explained.

First, the fastener is designed to reduce the size of the head 3. A smaller head 3 will allow the corresponding reduction in the size of the socket 4, making the fastener thinner and finer so that it will not easily be distinguishable from merchandise.

For that purpose, the invention has brought about a total change in the head structure from the conventional one that is shown in FIGS 1 through 4. That is, the oscillating or foldable engagement projections 18 are eliminated and instead a skirt 3b is provided.

The skirt 3b has a circular form with one part cut off and can come into contact with the annular engagement surface 4c or 4d of the socket 4. Thus, while the conventional fastener is in contact with the annular flange at two engagement projections 18, the fastener of the invention has a significantly larger contact area. Furthermore, the skirt 3b does not project radially outwardly with respect to the head 3 as much as the engagement projections 18 does. This means that the provision of the skirt 3b enables a reduction in size of the head 3 and an increased engagement force between the head 3 and the socket 4.

Secondly, the fastener is designed to reduce the resistance against the head 3 being inserted into the insertion hole 4a of the socket 4. If the skirt 3b is difficult to deform, a large resistance will be encountered when the head 3 is inserted into the insertion hole 4a. To reduce the resistance and make insertion of the head 3 easy, the head 3 must be able to be deformed easily during insertion.

For this reason, the fastener of the invention is formed with a groove 3c at the head 3 to reduce the thickness of the walls 3q at the head 3 as much as possible.

Thirdly, the fastener of the invention is so designed that the connection of the head 3 and the socket 4 is so secure that the fastener cannot be disengaged unless broken. As mentioned above, the thinner the wall 3q of the head 3, the easier it will be to insert the head into the insertion hole 4a. However, when the filament 2 is tensed after the socket 4 and the head 3 are coupled, the resistance against tension becomes smaller as the wall 3q of the head 3 is reduced in thickness, with the result that the diameter of the skirt 3b will easily reduce, rendering the head 3 and the socket 4 easily disengageable. Since the head 3 is not stretched, its strength is not so high.

Therefore, as the wall 3q becomes thinner, the strength of the head 3 significantly reduces. This means that the head cannot resist the tension, so that the head 3 will easily deform reducing the diameter of the skirt 3b. To prevent this, the invention provides a rib 3p in the groove 3c to reinforce the head 3. That is, the rib 3p has the functions of limiting the deformation (inclination) of the thin head walls 3q toward the axis of the head 3 and of resisting and bearing the tension acting in the direction of the axis of the head 3.

Figure 10:
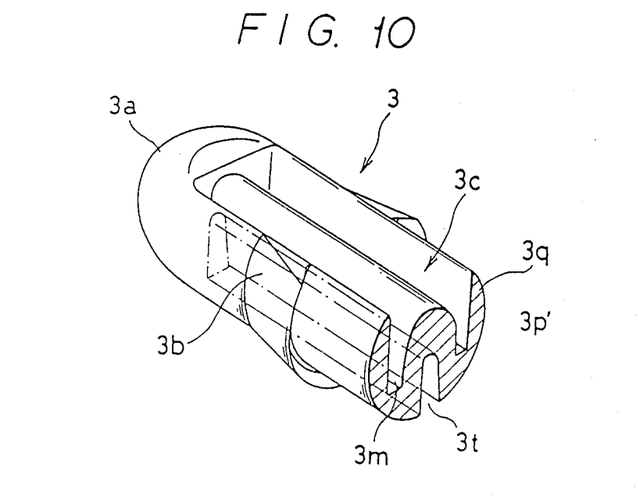
FIG. 10 is an enlarged perspective view of the cross-sectioned head of a fastener as the second embodiment of the invention.
Figure 11:
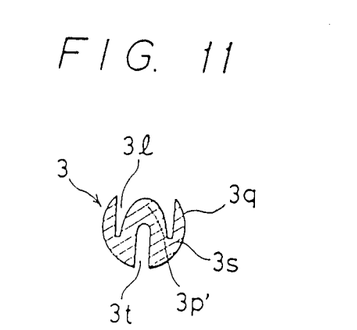
FIG. 11 is a cross-sectional view of the head of the fastener of the second embodiment taken along the line A—A of FIG. 5.
Figure 12:
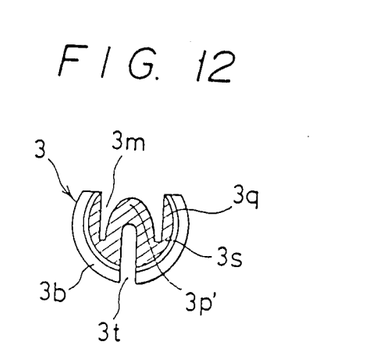
FIG. 12 is a cross-sectional view of the head of the fastener of the second embodiment taken along the line B—B of FIG. 5.

FIGS. 10 through 12 show the second embodiment of the invention.

In this embodiment, a slit 3t is formed along the entire length of the rib 3p'. The rib 3p' is higher than the rib 3p of FIGS. 7 to 9. When the head 3 is inserted into the insertion hole 4a of the socket 4, the slit 3t is compressed and thereby helps the head 3 to deform. On the other hand, the provision of the slit 3t reduces the reinforcement effect of the rib 3p'. Thus, in the second embodiment the rib 3p' is set higher to compensate for the reduction in the reinforcement effect.

Figure 13:
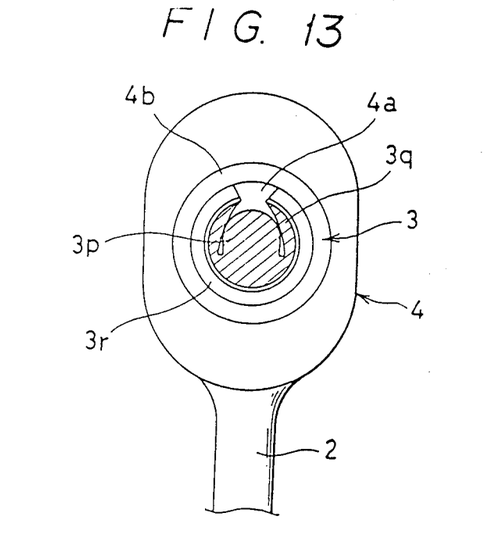
FIG. 13 and FIG. 14 are cross-sectional views showing the process of engaging the head and the socket of the fastener according to the invention.
Figure 14:
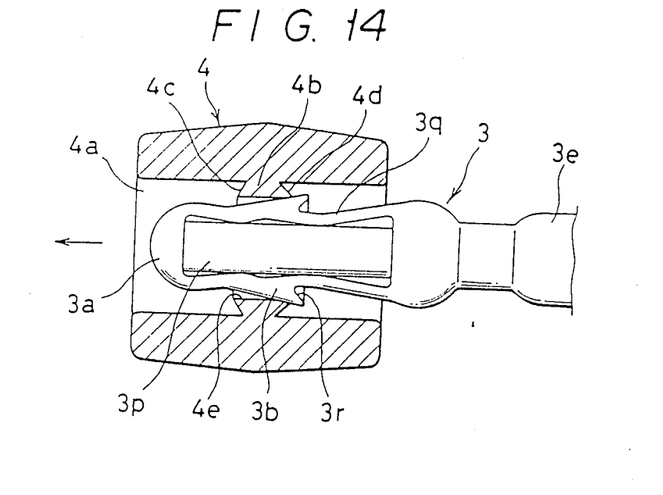

Now, we will explain the action of the fastener of the invention. Referring to FIGS. 13 and 14, when the head 3 is inserted into the insertion hole 4a of the socket 4, the skirt 3b comes into contact with and is pushed inwardly by the annular wall 4e of the annular flange 4b. At the same time, the walls 3q on each side of the groove 3c are pushed toward the rib 3p to contact and be supported by the rib 3p, and in this condition the head 3 is advanced in the direction of an arrow (FIG. 14) until the engagement surface 3r of the skirt 3b engages the annular engagement surface 4c.

As is seen from FIGS. 7 and 8, the two walls 3q, 3q on each side of the groove 3c are thin and their base portions 3s are significantly thin. Thus, when the head 3 passes through the insertion hole 4a of the socket 4, the groove 3c of the head 3 is narrowed by the annular wall 4e of the annular flange 4b. However, as shown in FIG. 13, the two walls 3q, 3q of the groove 3c are supported by the rib 3p so that the walls can be prevented from being deformed more than necessary. This allows the head 3 to easily restore its original shape by the resiliency of the walls 3q, 3q when the skirt 3b of the head 3 has passed through the annular engagement wall 4e. Then the skirt 3b immediately engages with the annular engagement surface 4c or 4d.

Figure 15:
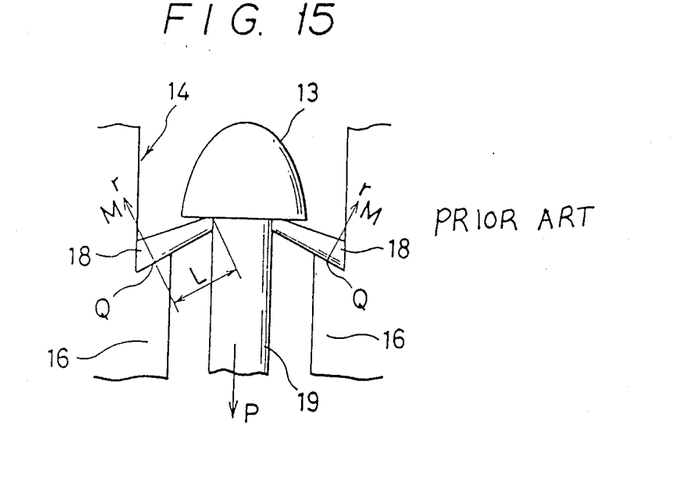
FIG. 15 is an explanatory drawing showing how tension acts after the conventional fastener is engaged.

FIG. 15 shows the action of forces when, after the head 13 of the conventional fastener (FIGS. 1 to 4) has been inserted through the socket 14, the fastener is tensed in the direction of arrow P to pull out the head 13.

In this case, the two engagement projections 18 are open abutting against and supported by the annular flange 16 in the socket 14 and the bending moment M acting at a contact point Q in the direction of arrow M is applied to the base portions of the engagement projections 18.

The magnitude of the moment M is expressed as the product of a force r acting at the contact point Q and the length L from the base of the head 13 to the point Q on the annular flange 16, i.e., $M = r \times L$.

Figure 16:
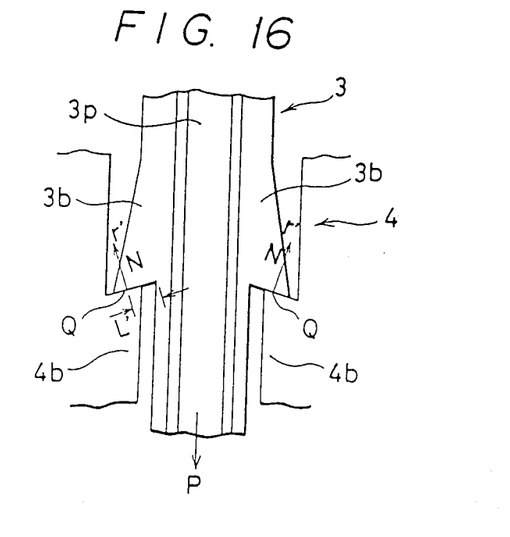
FIG. 16 is an explanatory drawing showing how tension acts after the fastener of the invention is engaged.

FIG. 16 illustrates the action of forces when, after the head 3 has been inserted into the socket 4, the fastener of the invention is tensed in the direction of arrow P.

In this case also, a bending moment acts on the skirt 3b in the direction of arrow N. The magnitude of the moment N is given by the product of a stress r' acting at a contact point Q and a length L' from the base of the skirt 3b to the contact point Q, i.e., $M = r' \times L'$.

Normally, the fastener of FIG. 15 has two engagement projections 18. The tension one engagement projection 18 has to bear is more than half the tension P to which the fastener is subjected, the exact value depending on the inclination angle of the engagement projections 18. This value is far larger than P/2.

The fastener according to the invention of FIG. 16 is characterized by the fact that the skirt 3b is formed around the head 3 in the range of about 270° as shown in FIG. 9 and 10.

The tension P acting on the fastener is borne by the long skirt 3b, so that the stress r' per unit area of the skirt 3b is much smaller than that acting on the conventional engagement projections 18.

It is apparent from the structural difference that the distance L' on the skirt 3b of the fastener according to the invention shown in FIG. 16 is much shorter than the distance L on the engagement projection 18 of the conventional fastener of FIG. 15. The force r' acting on the skirt 3b of the invention is significantly smaller than the force r in the conventional fastener.

As is seen from the above description, the moment N acting on the skirt 3b of the invention is much smaller than the moment M acting on the engagement projections 18 of the conventional fastener.

Moreover, in the conventional fastener the moment M acts in the direction of holding up the engagement projections 18. When held up, the engagement projections 18 will no longer have an engaging force, allowing the head 13 to slip backward through the socket 14.

In the fastener of the invention, however, the length L' of the skirt 3b on which the moment acts is very short and the area of the skirt 3b that bears the tension is large, so that the magnitude of the moment is substantially small. The moment can virtually be considered as a force acting parallelly with the axis of the head 3, i.e., the shearing force of the skirt 3b.

Since the rib 3p is provided in the groove 3c of the head, not a small portion of the tension that acts on the fastener is borne by the rib 3p. When the shearing force acts on the skirt 3b, the skirt 3b which is U-shaped in lateral cross-section tends to move toward the rib 3p. The inner surface of the skirt 3b is then supported on the rib 3p, which, as mentioned earlier, bears a large portion of the tension, producing a large resistance to prevent the skirt 3b from being forced backward through the insertion hole of the socket, so that the connection between the head and the socket cannot easily be broken.

Therefore, in this invention once the head 3 and the socket 4 are engaged, it is virtually impossible to break the engagement unless the socket 4 is destroyed.

As mentioned above, according to the invention a skirt is formed around the head 3 flaring away from the front end of the head 3; a groove 3c is formed in the head along the axis of the head; and a rib 3p is formed in the groove 3c.

Thus, the walls 3q on each side of the groove 3c can be made thin while an excessive deformation of the head 3 is limited by the rib 3p. This reduces the resistance against the head 3 being inserted through the annular wall 4e and permits easy engagement of the head 3 and the socket 4.

Because the walls 3q are made thin, the rib 3p bears a part of the resisting force of the head 3 against the tension. And after the head 3 is coupled with the socket 4, the rib 3p continues to provide a large resisting force against the tension. Thus, once engaged, the fastener engagement cannot be released unless the socket is broken.

The fastener of the invention, therefore, can be made very small, sufficiently fine and thin so that it will not degrade the appearance of the merchandise to which it is attached.

I claim:

1. In a fastener having a filament, a head at one end of the filament and a socket at the other end of the filament with an insertion hole therein, these parts being integrally formed of synthetic resin, the invention characterized by:
    the head having an axially extending, collapse-facilitating groove;
    a skirt on the head extending therearound and being interrupted by the groove;
    an annular flange in the insertion hole of the socket for engagement beneath the skirt when the head is pressed through the insertion hole;
    wherein the head is provided with a rib disposed in the groove for limiting collapse of the head.

2. A fastener as set forth in claim 1, wherein the rear end surface of the skirt is inclined making an acute angle with the axis of the head.

3. A fastener as set forth in claim 1, wherein the rib is cylindrical and provided over the entire length of the groove.

4. A fastener as set forth in claim 1, wherein the thickness of the annular flange progressively increases toward the axis of the socket.

5. A fastener as set forth in claim 1, wherein a groove-like slit is formed in the rib along its entire length.

* * * * *